3,101,571
UNIVERSAL NAIL TAB FOR LOCK JOINT SHINGLES
George F. Waske, Rte. 2, Parnell, Mo.
Filed Nov. 17, 1960, Ser. No. 69,906
2 Claims. (Cl. 50—249)

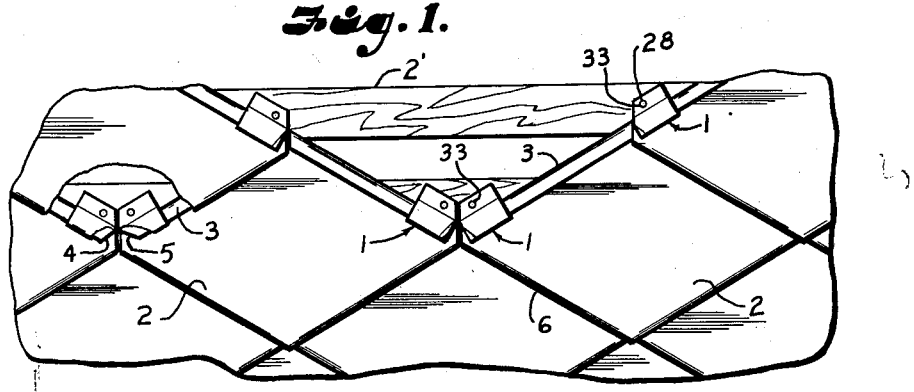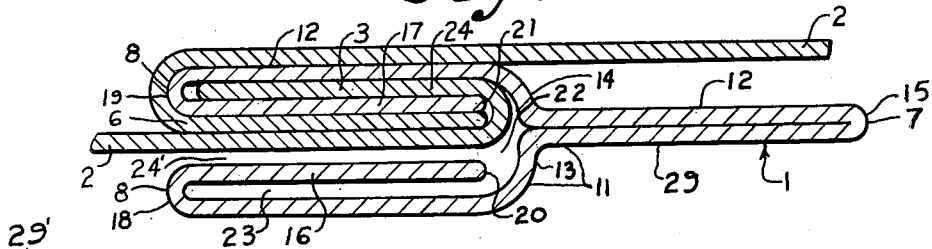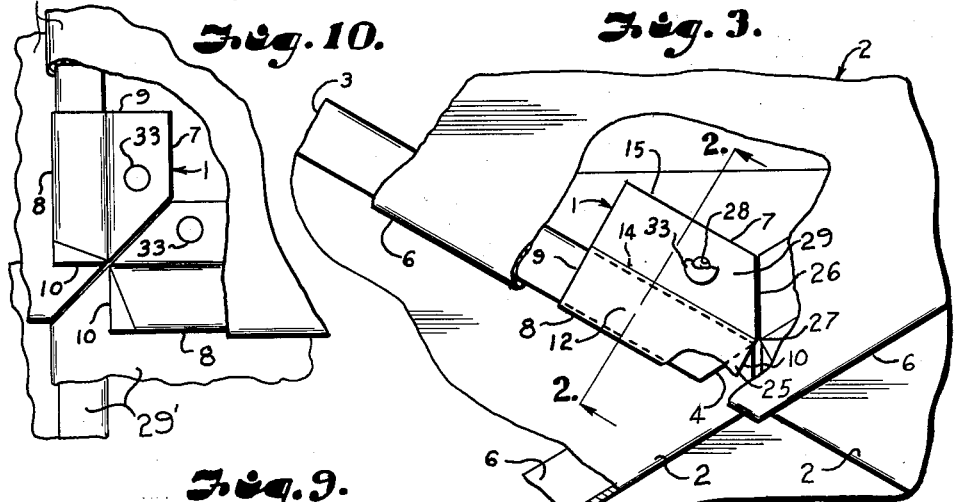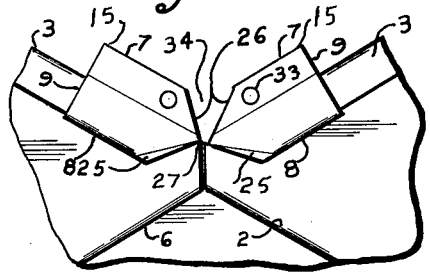

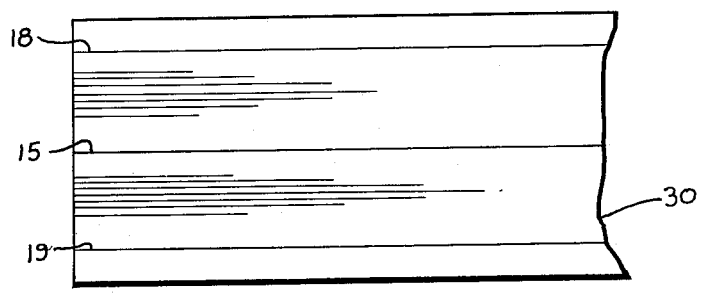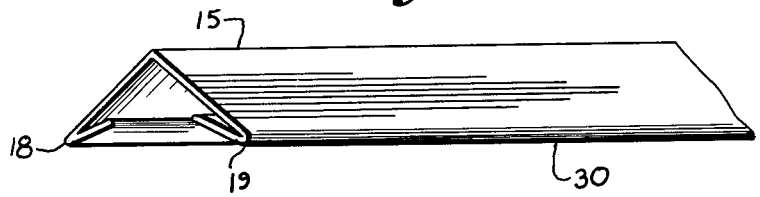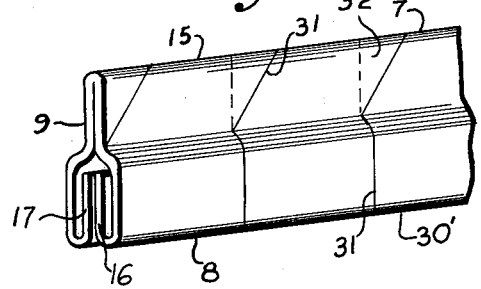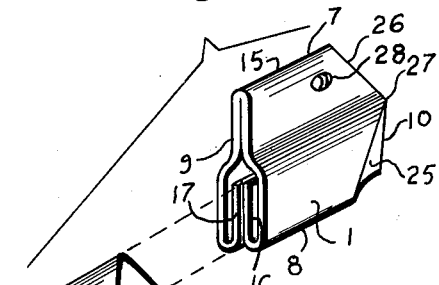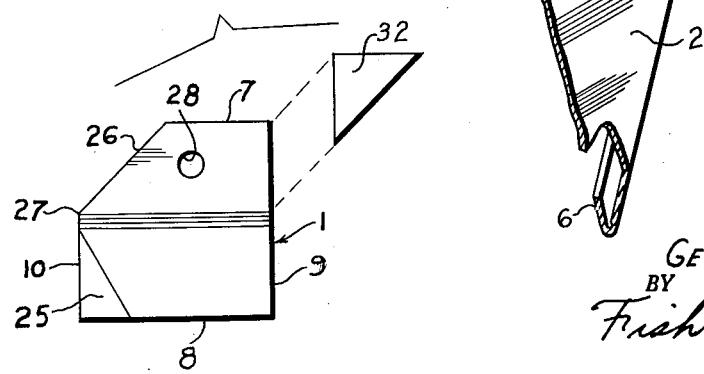

This invention relates to a nail tab for securing lock joint shingles, siding or panel plates to structures, and more particularly to a unique nail tab which may be inserted on either the right- or left-hand flange entrance thereof.

The principal objects of the present invention are: to significantly reduce the manufacturing costs in the production of lock joint shingles by eliminating integral nail tabs which heretofore have been formed on said shingles with consequent high labor and material costs and replacing them with inexpensive assembly tabs; to provide such devices which can be easily formed with a minimum of production steps and with inexpensive materials; to provide such devices which can be formed on commonly available roll forming machines or brakes or by extrusion; the provide such nail tabs which are interchangeable whereby a "right- or left-hand" model does not have to be selected but rather a single simple design may be used on either flange position with respect to the shingle; and to provide such nail tabs which may be designed for use on all standard shingle pitches or, if desired, produced especially for any particular pitch shingle.

Other objects and advantages of this invention will become apparent from the following description taken in connection with the accompanying drawings wherein are set forth by way of illustration and example certain embodiments of this invention.

FIG. 1 is a fragmentary plan view showing lock joint shingles secured to a building structure with my universal assembly nail tab.

FIG. 2 is a sectional view taken on the lines 2—2 of FIG. 3 showing details of my nail tab interlocked with a lock joint shingle.

FIG. 3 is a fragmentary enlarged plan view of the right-hand corner of a lock joint shingle with my nail tab secured thereon.

FIG. 4 is a fragmentary plan view of a strip of metal with fold lines indicated thereon prior to forming my nail tabs therefrom.

FIG. 5 is a perspective view showing the strip of metal of FIG. 4 in a partially folded condition.

FIG. 6 is a perspective view of the completely folded strip of FIG. 4 and having lines indicated thereon for dividing the strip into individual nail tabs.

FIG. 7 is a plan view showing the final form of the nail tab including the removal of a surplus corner and the crimping of troughs therein.

FIG. 8 is an exploded perspective view showing the position of my nail tab prior to insertion on a shingle flange.

FIG. 9 is a fragmentary plan view of the nail tabs with sloping diagonal edges forming a V-trough.

FIG. 10 is a fragmentary plan view of the nail tabs used on horizontally or vertically extending panel plates.

Referring more in detail to the drawings:

The reference numeral 1 designates generally nail tabs or members for securing siding or shingles 2 to a building structure 2'. The shingles 2 are usually of aluminum or galvanized ferrous metallic sheet material but can be manufactured from such materials as plastics or fiber glass impregnated with suitable resins. The shingles 2 are of the type having a substantially quadrilateral body and a pair of outwardly and downwardly turned upper flanges 3 presenting a right-hand flange side entrance 4 and a corresponding left-hand flange side entrance 5 (FIG. 1). The shingles 2 also carry a pair of inwardly and upwardly turned lower flanges 6 which interlock with respective upper flanges 3 of succeeding shingles 2 to provide a partially overlapping and interlocked covering structure.

The nail tabs constituting this invention are used to secure the individual shingles 2 in place with respect to succeeding shingles without interfering with the interlocking characteristics thereof. The nail tabs 1 are of one piece or integral construction and are preferably formed from sheet material which can be severely bent easily without cracking such as soft aluminum, soft galvanized sheet steel or the like. The nail tabs 1 are of polygonal shape and exhibit an upper edge 7 and a lower edge 8 which, in the example shown, are parallel. The nail tabs 1 also exhibit side edges 9 and 10 which, in the example shown, are perpendicular to the edges 7 and 8. The nail tabs are comprised of a rear layer 11 and a front layer 12 extending in substantially parallel and superimposed relation, although offset or step portions 13 and 14 respectively extend thereacross for a purpose apparent hereinafter. The rear and front layers 11 and 12 each form a mirror image of the other and are connected at an upper fold line 15 which coincides with the upper edge 7. Inwardly and upwardly turned layer flanges 16 and 17 are respectively connected to the layers 11 and 12 at respective lower fold lines 18 and 19 thereof. The lower fold lines 18 and 19 coincide with the nail tab lower edge 8. The layer flanges 16 and 17 extend longitudinally of the nail tab 1 in parallel and slightly spaced relationship and terminate at the ends thereof in side edges 9 and 10. The upper edges 20 and 21 respectively of the layer flanges 16 and 17 extend parallel to the upper and lower edges 7 and 8 and are spaced from the step portions 13 and 14 so as to produce a longitudinal cavity 22 within the nail tab. The layer flanges 16 and 17 are also slightly spaced from the rear and front layers 11 and 12 respectively and cooperate therewith to form adjacent rear and front elongated troughs 23 and 24 for receiving the shingle upper flanges 3, the body of the shingle 2 and lower flange 6 of a succeeding shingle being positioned in the space 24' between the layer flanges 16 and 17.

The nail tabs 1 have a diagonal crimped portion 25 adjacent the corner formed by the lower edge 8 and the side edge 10 for closing one end of the troughs 23 and 24 to aid in positioning on the shingles 2. A diagonal edge 26, discussed more fully hereinafter, extends from the upper edge 7 to a point 27 adjacent the crimped portion 25 and on the side edge 10. A bore or nail hole 28 extends through the nail tab on the upper portion 29 thereof.

The unique configuration of the nail tabs 1 permits the insertion thereof on the upper flanges 3 of the shingles either from the right-hand flange side entrance 4 or from the left-hand flange side entrance 5 by merely turning the particular nail tab over, eliminating the need for separate right-and left-hand tabs. In the example shown in FIG. 2, a nail tab has been inserted from the right-hand flange side entrance 4 whereby the upper flange 3 fills the front elongated trough 24. However, it is evident that if the nail tab is turned over and inserted from the left-hand flange side entrance 5 the rear elongated trough 23 would contain the flange 3. Thus, the nail tabs 1 are of a universal configuration which may be used with ease in either position for securing the respective shingles 2 in their proper position on the structure wall or roof.

FIG. 10 illustrates the use of the nail tabs on interlocking horizontally or vertically extending panel plates 29' rather than pitched siding or shingles 2. It is noted that the panel plates 29' are identical with the shingles 2 except that the outline thereof is rectangular and the edges thereof extend horizontally and vertically.

By using the nail tabs of this invention on interlocking shingles or panels, significant savings in material may be achieved since the wastage resulting from the complicated blank necessary for producing a shingle or panel with integral nail tabs is eliminated, permitting both labor and material savings.

In producing the nail tabs 1, the strip 30, which may be of any suitable material such as that used for the shingles, is driven through a suitable bending machine such as a brake or roll former for bending along the lines 15, 18 and 19, as indicated in FIGS. 4, 5 and 6, so as to produce a folded strip 30' (FIG. 6). It is evident that the strip 30' is also adapted to be produced by extrusion dies. By cutting the strip 30' along the lines indicated at 31, individual rough tabs are produced which may be finished by crimping at 25 (FIG. 7). If desired, the corner 32 may be removed as surplusage; however, it will not interfere with the operation of the nail tab if it is retained thereon. The crimped portion at 25 may be produced by merely squeezing the tab in the place indicated between two jaws of a suitable compressive tool such as a punch press. The trough closure produced by the crimped portion at 25 may also be accomplished by electric spot welding, if desired.

As indicated in FIG. 1, the nail tabs 1 are secured to the building structure by means of nails 33 driven through nail holes 28 and do not interfere with the interlocking of the lower flanges 6 with the upper flanges 3 of succeeding shingles 2 so that the nail tabs 1 are completely covered from view as the shingles are interlocked to cover the wall.

It is evident that the nail tab configuration of this invention is easily altered to be used with any pitch shingle (the height-width ratio of the shingle determines the pitch) by merely changing the angle of the diagonal edge 26 with respect to the lower edge 8 so that adjacent nail tabs do not overlap and thus interfere with each other. Although it is desirable for ease of shingle placement that the angle of the diagonal edge 26 is chosen so that the diagonal edges 26 of adjacent nail tabs abut when secured in position, as indicated in FIG. 1, it is noted that by sloping the diagonal edge 26 so that it passes closer to the nail hole 28 a V-trough 34 will be formed between abutting nail tabs (FIG. 9). By choosing the slope of the diagonal edge 26 so that adjacent edges 26 abut only with the highest pitch shingle contemplated, the nail tab becomes universal for use with any lower pitch shingle since the lower pitch will merely cause a wider V-trough between respective diagonal edges 26 without producing any interference between neighboring nail tabs.

It is to be understood that while I have illustrated and described one form of my invention, it is not to be limited to the specific form or arrangement of parts herein described and shown except insofar as such limitations are included in the claims.

What I claim and desire to secure by Letters Patent is:

1. In combination, a pair of identical universal assembly nail tabs and a shingle supported thereby, said shingle being of the type having a turned flange presenting a right-hand and a left-hand flange side entrance, said nail tabs each comprising; a sheet material member exhibiting upper and lower edges and side edges, said member having a front and a rear layer extending in substantially parallel and superimposed relation, an upwardly and inwardly turned layer flange connected to each of said layers at respective lower fold lines thereon, said lower fold lines forming said member lower edge, said layer flanges extending longitudinally of said member in parallel spaced relation, said layer flanges being spaced from and cooperating with respective layers to form rear and front elongated troughs respectively receiving said shingle flange at said right-hand and left-hand flange side entrance, means closing one end of said troughs but leaving the other end of said troughs open, and nails extending through said respective nail tabs adjacent said upper edges for supporting said nail tabs.

2. A universal assembly nail tab for supporting metallic shingles of the type having a substantially quadrilateral body and a pair of outwardly and downwardly turned upper flanges presenting a right-hand and a left-hand flange side entrance, said nail tab comprising; an integral sheet material member of polygonal shape exhibiting parallel upper and lower edges and parallel side edges, said member having a front and a rear layer extending in substantially parallel and superimposed relation and each forming a mirror image of the other, said front and rear layers being connected at an upper fold line forming said member upper edge, an inwardly and upwardly turned layer flange connected to each of said layers at respective lower fold lines thereon, said lower fold lines forming said member lower edge, said layer flanges extending longitudinally of said member and in parallel spaced relation and terminating in said member parallel side edges, said layer flanges being spaced from and cooperating with respective layers to form rear and front elongated troughs for receiving said shingle flanges, a crimped portion adjacent the corner formed by said member lower edge and one of said member side edges, said crimped portion closing one end of said troughs, and a diagonal edge extending from said member upper edge to a point adjacent said crimped portion, whereby said member is insertable over said shingle flanges from either the right or left flange side entrance thereof.

References Cited in the file of this patent

UNITED STATES PATENTS

| 1,433,333 | Andersson | Oct. 24, 1922 |
| 1,557,616 | Riley | Oct. 20, 1925 |
| 1,840,041 | Kellogg | Jan. 5, 1932 |
| 1,850,088 | Wadsworth | Mar. 22, 1932 |
| 2,126,676 | Thomas | Aug. 9, 1938 |
| 2,594,211 | Poupitch | Apr. 22, 1952 |

FOREIGN PATENTS

| 26,343 | Austria | Nov. 10, 1906 |